United States Patent Office 3,711,420
Patented Jan. 16, 1973

3,711,420
RUST PREVENTATIVE COMPOSITIONS CONTAINING A WAX, METAL NAPHTHENATE, AND A NATURAL FATTY BODY-POLYOL ESTER
Ernest Frank Jones, Newbury, England, assignor to Esso Research and Engineering Company, Linden, N.J.
No Drawing. Filed Nov. 23, 1970, Ser. No. 91,880
Claims priority, application Great Britain, Feb. 12, 1970, 6,827/70
Int. Cl. C23f 11/12
U.S. Cl. 252—389                                   7 Claims

ABSTRACT OF THE DISCLOSURE

A rust preventive composition suitable for the protection of stressing tendons used in the concrete shield of atomic power stations. This consists of a mixture of a wax (e.g. petrolatum), a metal naphthenate (e.g. that of a metal of Group IV of the Periodic System such as lead), and an ester derived from a polyol (e.g. a polyhydric alcohol having no more than 8 carbon atoms per molecule such as pentaerythritol) and a natural fatty body (e.g. lanolin).

---

This invention relates to rust preventive compositions.

Although for many applications, currently used rust preventive compositions are quite adequate it has been found that one composition, containing sodium sulphonates and lanolin, is not satisfactory for the protection of stressing tendons for use in the concrete shield of atomic power stations. It has been found that stray electrical currents and the presence of water in the ducts caused the rust preventive composition to emulsify due to the breakdown of the sodium sulphonates and lanolin. In the presence of the emulsion electrical currents cause pitting of the wire making up the tendon.

We have now discovered a rust preventive composition which does not have the disadvantages of the above-mentioned composition. According to this invention a rust-preventive composition comprises a mixture of a wax, e.g. petrolatum, a metal naphthenate, and an ester formed from a polyol and an natural fatty body. There may also be present a diluent such as a lubricating oil or white spirit.

The wax used in the composition can be any petroleum wax from an oily paraffin wax to a hard de-oiled petrolatum, or a natural wax such as carnauba wax or bees wax. One could use a hard microcrystalline wax, but in general petrolatum is preferred.

The diluent can be a lubricating oil such as a hydrocarbon oil or a synthetic oil, e.g. a diester derived from adipic or sebacic acid with a monohydric alcohol such as 2-ethyl hexanol. The oil is however preferably a mineral oil.

The metal naphthenate can be a naphthenate of any metal, e.g. sodium, calcium, barium, zinc, aluminium, iron, or cobalt. It is however preferably a naphthenate of a metal of Group IV of the Periodic System, e.g. of tin or lead.

The ester is derived from a polyol and a natural fatty body. Thus it can be derived from sorbitan, mannitan, pentaerythritol, or trimethylol propane and other polyhydric alcohols preferably having no more than 8 carbon atoms per molecule. Suitable natural fatty bodies include animal fatty bodies such as lanolin, wool grease, tallow or castor oil. The preferred ester is the pentaerythritol ester of lanolin.

Preferred quantities (by weight) for the components of the rust-preventive composition are as follows:

|  | Percent |
|---|---|
| Wax | 60–90 |
| Oil | 4–15 |
| Naphthenate | 4–10 |
| Ester | 2–8 |

Other components which may be included in the rust preventive composition of this invention are antioxidants such as phenyl α-naphthylamine.

EXAMPLE 1

A rust preventive composition was prepared by mixing together the following ingredients after heating the petrolatum to 90° C. The lead naphthenate was actually added as a 50/50 solution in mineral oil, but the quoted percentages refers only to the lead naphthenate itself.

|  | Wt. percent |
|---|---|
| Mineral oil, 42 cs. at 210° F. | 9.6 |
| Mineral oil, 7.75 cs. at 210° F. (solvent for lead naphthenate) | 4.0 |
| Petrolatum | 77.4 |
| Lead naphthenate (30% Pb) | 4.0 |
| Pentaerythritol ester of lanolin | 5.0 |

This composition was tested and compared with a prior art composition by smearing wires with the rust preventive composition in each case and applying a potential of 10 volts for 100 hours when the wires were submerged in water. The prior art composition was found to have emulsified and this led to pitting of the wires but with the composition of this invention no emulsification and no pitting took place.

EXAMPLE 2

A rust preventive composition was prepared by mixing together the following ingredients after heating the petrolatum to 90° C.

|  | Wt. percent |
|---|---|
| Mineral oil, 7.8 cs. at 210° F. | 4.0 |
| Petrolatum | 87.0 |
| Lead naphthenate (30% Pb) | 4.0 |
| Pentaerythritol ester of lanolin | 5.0 |

This composition was tested by smearing wires with the composition and applying a potential of 10 volts for 1000 hours when the wires were submerged in water. At the end of this time no emulsification or pitting had occurred.

What is claimed is:
1. A rust-preventive composition consisting essentially of a mixture of the following components, in percentage by weight based on the total composition:
   (a) 60 to 90 weight percent of a wax selected from the group consisting of a petroleum wax, carnauba wax, and beeswax;
   (b) 4 to 10 weight percent of a naphthenate salt of a metal selected from the group consisting of sodium, calcium, barium, zinc, aluminum, iron, cobalt, tin, and lead;
   (c) 2 to 8 weight percent of an ester of a polyhydric alcohol of up to 8 carbon atoms and a fatty body selected from the group consisting of lanolin, wool grease, tallow and castor oil, and

(d) 0 to 15 weight percent of a diluent oil selected from the group consisting of mineral lubricating oil and synthetic diester lubricating oil.

2. A composition as defined by claim 1 wherein said polyhydric alcohol is selected from the group consisting of sorbitan, mannitan, pentaerythritol and trimethylol propane.

3. A composition as defined by claim 1 wherein said wax is petrolatum.

4. A composition as defined by claim 1 wherein said metal naphthenate is lead naphthenate.

5. A composition as defined in claim 1 wherein said polyhydric alcohol is pentaerythritol.

6. A composition as defined by claim 1 wherein said fatty body is lanolin.

7. A composition as defined by claim 1 wherein there is present from 4 to 15 weight percent of a diluent mineral lubricating oil.

References Cited

UNITED STATES PATENTS

| | | | |
|---|---|---|---|
| 2,725,334 | 11/1955 | Conrad et al. | 252—396 |
| 3,183,092 | 5/1965 | Mackey et al. | 96—83 |
| 3,125,522 | 3/1964 | Reudink | 252—33.4 |
| 3,405,072 | 10/1968 | Kinnavy | 252—396 |
| 3,455,716 | 7/1969 | Loring et al. | 252—389 |

LEON D. ROSDOL, Primary Examiner

I. GLUCK, Assistant Examiner

U.S. Cl. X.R.

21—2.5, 2.7; 106—14; 252—396